July 31, 1934.  H. K. HALIKMAN  1,968,143

GOGGLES

Original Filed July 15, 1932

Inventor:
Harris King Halikman.
by Franklin E. Low
Att'y.

UNITED STATES PATENT OFFICE 1,968,143

GOGGLES

Harris King Halikman, East Boston, Mass.

Original application July 15, 1932, Serial No. 622,593. Divided and this application February 25, 1933, Serial No. 658,482

1 Claim. (Cl. 88—43)

This invention relates to an improvement in goggles especially pertaining to the bridge for the goggles which connects the lenses together and to an improved construction of nose piece mounted on said bridge.

The object of the invention is to provide a pair of goggles in which the lenses are pivotally mounted upon the bridge and, further, in a construction in which the nose piece is pivotally mounted on the bridge.

This invention is a division of an application for "Goggles", filed July 15, 1932, Serial No. 622,593.

The invention consists in the combination and arrangement of parts set forth in the following specification and particularly pointed out in the claim.

Referring to the drawing:—

Like numerals refer to like parts throughout the several views of the drawing.

Figure 1:
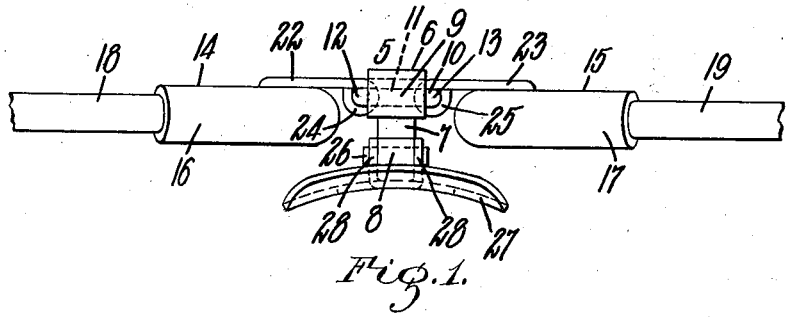
Fig. 1 is a plan view of my improved goggles with the lenses attached thereto and broken away, the same being made on a very much enlarged scale.
Figure 2:
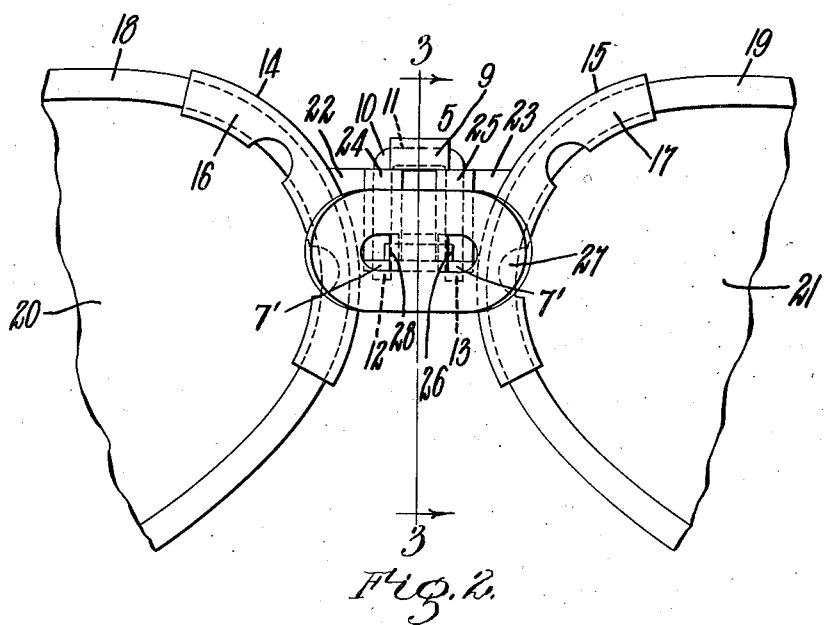
Fig. 2 is a rear elevation of the goggles also broken away and made upon an enlarged scale.
Figure 3:
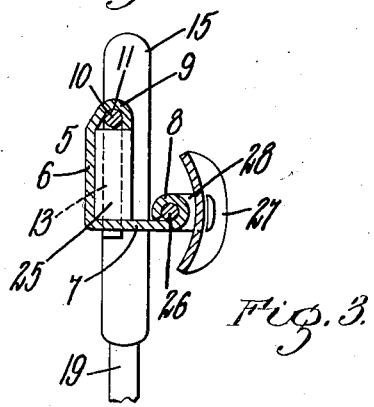
Fig. 3 is a vertical sectional elevation taken on the line 3—3, looking in the direction of the arrows on said line.

In the drawing, 5 is a bridge embodying a vertical center piece 6 constituting a support for lenses and manufactured of sheet metal, bent rearwardly at its lower end at 7 to form what in effect constitutes a reinforcing flange for the center piece and terminating in a tubular portion or eye 8 positioned at the rear of the center piece, see Fig. 3. The upper end of the center piece or plate 6 is bent rearwardly and downwardly to form a hook 9 and a staple 10 is supported upon the center piece 7 with its cross piece 11 held in the hook 9 and the legs 12 and 13 of the staple extending downwardly and into ears 7' formed integral with the rearwardly extending flange portion 7 of the bridge 5. A pair of lens holders 14 and 15 are pivotally supported upon the legs 12 and 13 respectively. These lens holders consist of segmental clamp portions 16 and 17 which hold the rims 18 and 19 of the lenses 20 and 21 and, further, the lens holders embody therein arms 22 and 23 which terminate at their adjacent ends in tubular portions 24 and 25 pivotally mounted respectively on the legs 12 and 13 of the staple 10.

A pivotal pin 26 is mounted in the eye 8 and a nose piece 27 is mounted upon this pin to rock thereon. The nose piece 27 has ears 28 formed integral therewith and bent therefrom, which are secured to the opposite end portions of the pivotal pin 26 and abutting against the end faces of the eye 8 so that the nose piece 27 can tip to adjust itself to different forms of noses around a horizontal pivot. It will thus be seen that the lenses 20 and 21 are pivotally mounted upon the bridge 5 to swing upon a vertical axis and that the nose piece 27 is pivotally mounted upon the bridge 5 to rock upon a horizontal axis and it will furthermore be seen that when the goggles are positioned upon the nose of the wearer the nose piece 27 can tip and automatically adjust itself to different forms of noses.

I claim:

A bridge for goggles having, in combination, a vertical center piece constituting a support for lenses and consisting of a piece of sheet metal bent rearwardly at its lower end and terminating in an eye positioned at the rear of the center piece, a horizontal pivot in said eye, and a nose piece embodying therein ears mounted on said pivot at opposite sides of said eye said ears being pressed rearwardly from the material of said nose piece.

HARRIS KING HALIKMAN.